(12) United States Patent
Drumm et al.

(10) Patent No.: US 7,022,305 B2
(45) Date of Patent: Apr. 4, 2006

(54) NANOSCALE CORUNDUM POWDERS, SINTERED COMPACTS PRODUCED FROM THESE POWDERS AND METHOD FOR PRODUCING THE SAME

(75) Inventors: Robert Drumm, Saarbruecken (DE); Christian Goebbert, Riegelsberg (DE); Kai Gossmann, Saarbruecken (DE); Ralph Nonninger, Saarbruecken-Buebingen (DE); Helmut Schmidt, Saarbruecken-Guedingen (DE)

(73) Assignee: Leibniz-Institut fuer neue Materialien Gemeinnuetzige GmbH, Saarbruecken (DE)

( * ) Notice: Subject to any disclaimer, the term of this patent is extended or adjusted under 35 U.S.C. 154(b) by 224 days.

(21) Appl. No.: 10/312,474

(22) PCT Filed: Jul. 20, 2001

(86) PCT No.: PCT/EP01/08422

§ 371 (c)(1),
(2), (4) Date: Dec. 23, 2002

(87) PCT Pub. No.: WO02/08124

PCT Pub. Date: Jan. 31, 2002

(65) Prior Publication Data

US 2003/0098529 A1    May 29, 2003

(30) Foreign Application Priority Data

Jul. 21, 2000  (DE) .................................. 100 35 679

(51) Int. Cl.
*C01F 7/00*    (2006.01)
(52) U.S. Cl. ...................... 423/625; 423/122; 423/127; 423/627; 501/153; 264/624; 264/658

(58) Field of Classification Search ................ 423/122, 423/127, 625, 627; 501/153; 264/624, 658
See application file for complete search history.

(56) References Cited

U.S. PATENT DOCUMENTS

| 4,657,754 A | 4/1987 | Bauer et al. |
| 4,818,515 A * | 4/1989 | Ceresa et al. ................ 423/625 |
| 4,845,056 A | 7/1989 | Yamanis |
| 6,066,584 A * | 5/2000 | Krell et al. .................. 501/127 |
| 6,503,475 B1 | 1/2003 | McCormick et al. |

FOREIGN PATENT DOCUMENTS

| CN | A 1085187 | 4/1994 |
| DE | 4116523 A | 11/1991 |
| DE | 19922492 A | 11/2000 |
| EP | 554908 A | 8/1993 |
| EP | 0200487 A | 11/1999 |
| WO | WO 98 55400 | 12/1998 |
| WO | WO 99 59754 A | 11/1999 |

* cited by examiner

*Primary Examiner*—Steven Bos
(74) *Attorney, Agent, or Firm*—Hollander Law Firm, P.L.C.

(57) ABSTRACT

Nanoscale corundum powders are obtained by first producing an $Al_2O_3$ precursor by adding seed crystals to an aqueous solution of an aluminium compound and adding a base and then converting the $Al_2O_3$ precursor into corundum by calcination at a high temperature. Before the calcination, the salts that are present in addition to the $Al_2O_3$ precursor are separated off. The resulting product is calcined at temperatures of 700 to 975° C. and any fines that may be present are removed. The resulting corundum powders can be sintered at temperatures of $\leq 1200°$ C. to produce compacts or components of multiple layer systems.

16 Claims, No Drawings

NANOSCALE CORUNDUM POWDERS, SINTERED COMPACTS PRODUCED FROM THESE POWDERS AND METHOD FOR PRODUCING THE SAME

This application is a 371 national stage application of PCT/EP01/08422 filed Jul. 20, 2001, which claims priority of German Application No. 100 35 679.6, filed Jul. 21, 2000.

The invention relates to nanosize corundum (α-alumina) powders, to a process for preparing them and to their processing to produce sintered bodies.

Pulverulent corundum (α-$Al_2O_3$) is an important raw material for producing aluminium oxide ceramics, which can in principle be achieved in two ways. One way starts out from shaped bodies which have been made directly from α-alumina powder (α-$Al_2O_3$ powder), while the other starts out from shaped bodies which comprise a α-$Al_2O_3$ precursor (for example the γ or θ phase) which is then converted in situ into the α-$Al_2O_3$ phase.

In the processing of customary α-alumina powders to give dense sintered bodies, the sintering temperature of α-alumina is, depending on the initial particle size used, from 1300 to 1600° C. There have been, many attempts to reduce the sintering temperature of α-alumina or to obtain the thermodynamically stable α-$Al_2O_3$ phase at significantly lower temperatures. The most important obstacle in this context is the high activation energy of homogeneous nucleation, which is greatly delayed kinetically so that such nucleation can only be achieved from the other $Al_2O_3$ phases (e.g. the γ or θ phase) at relatively high temperatures, since the diffusion coefficients are higher here. There have therefore been many attempts to achieve a significant reduction in the transformation temperature by addition of nuclei; cf. EP-A-554908, U.S. Pat. No. 4,657,754 and WO 98/55400.

For example, U.S. Pat. No. 4,657,754 describes nanosize α-alumina having a mean particle size of from 20 to 50 nm ("nanocorundum") which is prepared by seeding, and this allows the synthesis temperature to be reduced sufficiently for α-$Al_2O_3$ powder having a density of 3.78 g/$cm^3$ (corresponding to 95% of the theoretical density) to be present at 1000° C.

In CN-A-1085187, Weng et al. describe another process starting out from salt solutions, which likewise gives nanocorundum having a diameter of from 10 to 15 nm at synthesis temperatures of from 1100 to 1300° C.

However, a synthesis temperature of 1000° C. is too high for many purposes, in particular for cofiring processes in microelectronics using foils or the sintering of pastes to a high density. The same applies to the relatively high sintering temperature of conventional α-alumina powder of from 1300 to 1600° C.

It has now surprisingly been found that the synthesis temperature can be reduced to values below 1000° C. by means of a particular process technique which gives an only weakly agglomerated nanosize α-alumina (corundum) powder which can be sintered at relatively low sintering temperatures. This apparently small improvement is of great industrial importance since a significantly wider field of application can be addressed as a result. For example, novel multilayer systems can be processed in a single cofiring step, for which a plurality of sintering steps at relatively high temperatures were necessary in the past, since all multilayer elements present can be densified at the lower sintering temperature.

The invention provides a process for preparing nanosize α-alumina powders, in which an $Al_2O_3$ precursor is firstly prepared by admixing an aqueous solution of an aluminium compound with seed crystals and adding a base and then converting the $Al_2O_3$ precursor into α-alumina by calcination at elevated temperature, which is characterized in that the salts present in addition to the $Al_2O_3$ precursor are separated off prior to the calcination, the product obtained is calcined at temperatures of from 700 to 975° C. and any fines (<40 nm) present are removed.

Aluminium compounds suitable for preparing the $Al_2O_3$ precursor are preferably water-soluble aluminium salts such as aluminium(III) nitrate, aluminium(III) chloride, aluminium(III) acetate or aluminium(III) ethoxide.

These aluminium compounds are, for example, dissolved in deionized water and admixed with seed crystals which preferably have a particle size of <100 nm. Examples of suitable seed crystals are α-alumina or diaspore nuclei.

A base is added and, as a result, the desired $Al_2O_3$ precursor requited for conversion into α-alumina at temperatures below 1000° C. is formed during a ripening time. Examples of bases which can be used are inorganic or organic bases such as sodium hydroxide, potassium hydroxide, calcium hydroxide or magnesium hydroxide, ammonia, urea, aliphatic and aromatic amines, with particular preference being given to bases such as ammonia which can be separated off thermally.

The precipitation or ripening is usually carried out at temperatures of from 50 to 100° C., preferably from 70 to 90° C. and particularly preferably from 80 to 90° C., over a period of from 20 to 145 hours, preferably from 60 to 90 hours and particularly preferably from 70 to 80 hours.

After this ripening, the preparation of nanocorundum is preferably carried out by one of the following two alternative methods.

In method 1, the aqueous solvent is removed, preferably by freeze drying, and the salts present as impurities are decomposed thermally at temperatures of from 150 to 500° C., for example at 400° C. The product obtained is mechanically comminuted and converted into α-$Al_2O_3$ by calcination at temperatures of from 700 to 975° C., preferably from 750 to 950° C. and in particular from 800 to 900° C. Calcination is usually carried out for a period of from one to three hours.

The α-alumina powder obtained by method 1 has a high proportion of α-alumina, but as secondary phase still contains a small proportion of fines (<40 nm) which comprises mainly phases other than α-$Al_2O_3$. It is important for the purposes of the invention to remove at least most of these fines so that the nanosize α-alumina powder can subsequently be densified at sintering temperatures of ≦1200° C.

The removal of the fines is preferably carried out by centrifugation. For this purpose, the α-alumina powder which has been prepared is dispersed in an aqueous solution with the aid of a dispersant (surface modifier) and subsequently centrifuged one or more times. Suitable dispersants are, for example, inorganic acids (preferably $HNO_3$), aromatic or aliphatic monocarboxylic, dicarboxylic or polycarboxylic acids, aromatic or aliphatic oxacarboxylic acids such as trioxadecanoic acid (TODA), β-dicarbonyl compounds and amino acids. The dispersant concentration is matched to the specific surface area of the α-alumina powder synthesized, so that, for example, 4–5 μmol of dispersant are available per $m^2$ of $Al_2O_3$ surface.

In method 2, the salt loading is reduced or removed by dialysis. For this purpose, the solution containing the $Al_2O_3$ precursor is introduced into dialysis tubes and the latter are placed in deionized water. The dialysed solution is subsequently frozen and freeze dried. The powder obtained can, if desired, be calcined at from 150 to 500° C. (e.g. 400° C.)

to achieve complete removal of the salts still present. The powder is converted into α-Al₂O₃ as in method 1 by calcination at temperatures of from 700 to 975° C., preferably from 750 to 950° C. and in particular from 800 to 900° C.

In this method 2, no or very little fines comprising non-α-Al₂O₃ phases are formed during the synthesis, so that the α-Al₂O₃ powder obtained can, after surface modification using suitable surface modifiers such as inorganic acids (preferably HNO₃), aromatic or aliphatic monocarboxylic, dicarboxylic or polycarboxylic acids, aromatic or aliphatic oxa carboxylic acids, e.g. trioxadecanoic acid (TODA), β-dicarbonyl compounds or amino acids, be densified directly at sintering temperatures of ≦1200° C. The amount of surface modifier is matched to the specific surface area of the α-alumina powder synthesized, so that, for example, 4–5 μmol of dispersant are available per m² of Al₂O₃ surface. The surface modification can be carried out, for example, by means of a ball mill (3–4 h, aluminium oxide milling media ≦1 mm), mortar mills, a three-roll mill or a kneader, matched to the subsequent shaping technique.

The result is a redispersible α-alumina powder which can be processed further by various shaping processes such as tape casting, screen printing, pad printing, electrophoresis, slip casting, extrusion, injection moulding. The mean primary particle size is usually from 30 to 150 nm, preferably from 40 to 100 nm and particularly preferably from 50 to 70 nm. The α-alumina powder is only weakly agglomerated in the redispersed state. It has a phase purity (α-Al₂O₃ content) of ≧80% by weight, preferably ≧90% by weight and in particular ≧95% by weight, and a density of ≧3.90 g/cm³, preferably ≧3.93 g/cm³, particularly preferably ≧3.95 g/cm³.

The α-alumina powder prepared according to the invention is mixed with customary processing aids, e.g. organic solvents, binders, plasticizers, for further shaping. Suitable solvents are, for example, ethylene glycol, diethylene glycol monobutyl ether and diethylene glycol monoethyl ether, either individually or as mixtures. Examples of binders which could be used are cellulose derivatives such as hydroxypropylcellulose, polyvinylpyrrolidone, acrylate polymers and oligomers, methacrylates such as tetraethylene glycol dimethacrylate and polyethylene glycol dimethacrylate. Use is made of, for example, 15% by weight of binders, based on the solid employed. Plasticizers used are, for example, polyethylene glycol dimethacrylates, polyethylene glycols (e.g. PEG 600, PEG 800, PEG 1000, PEG 2000, PEG 6000). Use is made of, for example, 25% by weight, based on the binder employed.

The nanosize α-alumina powders of the invention are suitable for producing dense Al₂O₃ sintered bodies in the form of components or constituents of multilayer structures. Specific applications of these components and multilayer systems are (micro)electronics, sensors (gas, pressure or piezoelectric sensors), microsystem technology (e.g. microreactors), ceramic filter elements and catalyst supports.

The following examples illustrate the invention.

EXAMPLE 1

Preparation of Nanocorundum 16 l of deionized water are placed in a stirred glass vessel, and 4 kg of Al(NO₃)₃. 6H₂O while stirring. 60 g of aluminium oxide nuclei (α-aluminium oxide or diaspore) are then added in the form of a 5–20% by weight aqueous suspension (pH>3). The mixture is heated to a temperature of 85° C.±5° C. The pH of the solution is adjusted to 4.8±0.1 by means of aqueous ammonia solution (25% by weight). The mixture is maintained at a temperature of 85° C.±5° C. for 72 hours while stirring. After 72 hours, two alternative ways of preparing nanosize α-alumina can be employed.

Method 1

The "solution" obtained is frozen (for example at −30° C.) and subsequently dried (freeze drying). The powder is then heated to 400° C. at a heating rate of 2 K/min (air atmosphere) and maintained at this temperature for one hour. After cooling, the powder is dry milled in a mortar mill for one hour. The powder is subsequently brought to 800° C. at a heating rate of 10 K/min and immediately heated to 900° C. at a heating rate of 2 K/min and maintained at this temperature for one hour. The powder prepared in this way has a specific surface area of about 20–60 m²/g and a density of 3.6–3.9 g/cm³, in each case depending on the nuclei used.

After cooling, the powder is dispersed in a ball mill using aluminium oxide milling media (≦1 mm) and an organic acid (TODA) as dispersant/surface modifier for 3–4 hours. The dispersant content is matched to the specific surface area of the aluminium oxide powder synthesized, so that 4–5 μmol of TODA are present per m² of Al₂O₃ surface. After the tiling process, the fines in the aluminium oxide powder obtained are separated off by multiple centrifugation. The separation limit in the centrifugation is, on the basis of calculation, at a particle size of about 40 nm. The fines comprise predominantly (>90%) non-α-Al₂O₃ particles. The centrifugate is freeze dried to remove the solvent.

Method 2

The "solution" obtained is purified by dialysis in portions containing about 400 g of ammonium nitrate to remove the dissolved ammonium nitrate ions. For this purpose, the solution is introduced into a dialysis tube (pore size: 2.5–3 nm) and stored in deionized water for about 2 hours, after which the water is replaced and dialysis is continued for another two hours. The dialysed solution is frozen (for example at −30° C.) and subsequently dried (freeze drying). If desired, the powder can additionally be heated to 400° C. at a heating rate of 2 K/min (air atmosphere) and maintained at this temperature for one hour. However, this step is not absolutely necessary. The powder is subsequently brought to 800° C. at a heating rate of 10 K/min and immediately heated to 900° C. at a heating rate of 2 K/min. A hold period of one hour is employed at 900° C.

The powder prepared in this way has a specific surface area of about 18–22 m²/g and a density of 3.95–3.98 g/cm³. The primary particle size is 40–70 nm, and the powder is weakly agglomerated in the redispersed state.

EXAMPLE 2

Production of Sintered Aluminium Oxide Layers in Multilayer Systems 10.5 g of the α-Al₂O₃ prepared in Example 1 are homogeneously mixed with 2.8 g of a 1:1 solvent mixture of ethylene glycol and diethylene glycol monobutyl ether and 0.5 g of polyvinylpyrrolidone as binder. As mixers, it is possible to use mortars, kneaders or mortar mills. The paste obtained is passed a number of times through a three-roll mill for final homogenization.

The aluminium oxide paste is applied by a thick layer method (screen printing) to previously sintered α-alumina substrates or green (unsintered) substrates comprising yttrium-stabilized (3 mol % of Y₂O₃) zirconium dioxide in dry layer thicknesses up to 30 μm and dried so that they were free of cracks at 80° C. in a convection drying oven. The printed layers on the α-alumina substrates are densified firmly at 1200° C. (heating rate: 5 K/min) with a hold time of one hour. Densification of the α-$Al_2O_3$ layers printed onto green (unsintered) substrates comprising yttrium-stabilized zirconium dioxide is carried out in two stages. In the first stage, the organics present in the composite are removed by thermal decomposition at temperatures up to 450° C. under a protective gas atmosphere (nitrogen). The heating time is 10 hours, hold time: 3 hours. Thermal densification to give the dense material composite is carried out in an atmosphere furnace at temperatures of 1200° C., hold time: 3 hours, heating rate: 5 K/min.

EXAMPLE 3

Production of Sintered Aluminium Oxide Bodies from α-$Al_2O_3$ Powder Prepared According to the Invention 2 g of the α-$Al_2O_3$ powder prepared in Example 1 are homogeneously mixed with 1 g of a solvent mixture of ethylene glycol/diethylene glycol monobutyl ether (1:1) and 0.15 g of a cellulose binder and dried at 100° C. 200 mg of the mixture are compacted in a uniaxial pressing tool having an internal diameter of 5 mm under a pressure of 200 MPa. The compact is subsequently after-compacted at 400 MPa in a cold isostatic press. The pressed green body is densified thermally at 1200° C. (1 h) under an air atmosphere. After sintering, the shaped body has a density of 3.85 g/cm$^3$ (96.5% of theory).

What is claimed is:

1. A process for preparing a nanosize α-alumina powder, comprising:
   preparing an $Al_2O_3$ precursor by mixing an aqueous solution of an aluminum compound with seed crystals and adding a base;
   separating any salts present from the $Al_2O_3$ precursor; and
   calcining the $Al_2O_3$ precursor into nanosize α-alumina powder at a temperature of from 700° C. to 975° C.

2. The process of claim 1 wherein the aluminum compound is selected from the group consisting of aluminum (III) nitrate, aluminum(III) chloride, aluminum(III) acetate, and aluminum(III) ethoxide.

3. The process of claim 1 wherein the seed crystals are corundum or diaspore.

4. The process of claim 1 wherein the base is a base that can be removed by heating.

5. The process of claim 4 wherein the base is ammonia.

6. The process of claim 1 wherein the $Al_2O_3$ precursor is precipitated at a temperature of from 50° C. to 100° C.

7. The process of claim 1 wherein any salts present are separated from the $Al_2O_3$ precursor by dialysis, thermal decomposition, or both dialysis and thermal decomposition.

8. The process of claim 1 wherein the $Al_2O_3$ precursor is calcined at a temperature of from 800° C. to 900° C.

9. The process of claim 1 further comprising:
   removing from the nanosize α-alumina powder any fines present having a particle size of less than 40 nm.

10. The process of claim 9 wherein any fines present are removed by dispersion of the nanosize α-alumina powder and subsequent centrifugation.

11. The process of claim 1 further comprising:
    mixing the nanosize α-alumina powder with at least one processing aid to give a shapeable composition.

12. The process of claim 11 further comprising
    shaping the composition; and
    sintering the composition.

13. The process of claim 12 wherein the composition is sintered at a temperature of less than or equal to 1200° C.

14. The process of claim 1 wherein the nanosize α-alumina powder has an α-$Al_2O_3$ content of at least 80% by weight and a density of at least 3.90 g/cm$^3$.

15. The process of claim 12 wherein the shaping comprises shaping a layer of a multilayer system.

16. The process of claim 15 wherein the sintering comprises sintering the multilayer system in a single cofiring step.

* * * * *